United States Patent
Jang et al.

(10) Patent No.: US 11,850,943 B2
(45) Date of Patent: Dec. 26, 2023

(54) HYBRID POWERTRAIN FOR VEHICLE

(71) Applicants: Hyundai Motor Company, Seoul (KR); Kia Corporation, Seoul (KR)

(72) Inventors: Cheol Ho Jang, Hwaseong-Si (KR); Hae Seung Lee, Yongin-Si (KR); Dong Hwan Kwak, Hwaseong-Si (KR); Gi Young Kwon, Seoul (KR); Jeong Soo Park, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/982,244

(22) Filed: Nov. 7, 2022

(65) Prior Publication Data

US 2023/0347729 A1    Nov. 2, 2023

(30) Foreign Application Priority Data

Apr. 28, 2022   (KR) ........................ 10-2022-0052853

(51) Int. Cl.
*B60K 6/365*   (2007.10)
*B60K 6/442*   (2007.10)
*B60K 6/40*   (2007.10)

(52) U.S. Cl.
CPC .............. *B60K 6/442* (2013.01); *B60K 6/365* (2013.01); *B60K 6/40* (2013.01); *B60Y 2200/92* (2013.01)

(58) Field of Classification Search
CPC .......... B60K 6/365; B60K 6/442; B60K 6/40; B60Y 2200/92; F16H 37/082; F16H 57/10

See application file for complete search history.

(56) References Cited

U.S. PATENT DOCUMENTS

| | | | |
|---|---|---|---|
| 2021/0245730 A1* | 8/2021 | Trinkenschuh | B60W 20/30 |
| 2023/0041635 A1* | 2/2023 | Lehmann | B60K 6/405 |

FOREIGN PATENT DOCUMENTS

| | | | | |
|---|---|---|---|---|
| CN | 107914564 A | * | 4/2018 | |
| CN | 108944412 A | * | 12/2018 | |
| CN | 109130830 A | * | 1/2019 | |
| CN | 209224928 U | * | 8/2019 | ............ B60K 17/08 |
| CN | 111993881 A | * | 11/2020 | |
| KR | 10-2019-0140248 | | 12/2019 | |
| WO | WO-2022258111 A1 | * | 12/2022 | |

* cited by examiner

*Primary Examiner* — Tisha D Lewis

(74) *Attorney, Agent, or Firm* — MORGAN, LEWIS & BOCKIUS LLP

(57) ABSTRACT

A hybrid powertrain apparatus for a vehicle includes an engine, a first input shaft mounted to receive power from the engine, a first motor directly connected to the first input shaft, a second input shaft disposed concentrically with the first input shaft, a second motor directly connected to the second input shaft, a planetary gear set including three rotation elements, two of which are respectively connected to the first input shaft and the second input shaft and the remaining one of which is mounted to be selectively stationary, and an output gear integrally formed with the second input shaft to draw power.

9 Claims, 2 Drawing Sheets

| GEAR STAGE | CL | B |
|---|---|---|
| 1 | – | ● |
| 2 | ● | – |

HYBRID POWERTRAIN FOR VEHICLE

CROSS-REFERENCE TO RELATED APPLICATION

The present application claims priority to Korean Patent Application No. 10-2022-0052853, filed on Apr. 28, 2022, the entire contents of which is incorporated herein for all purposes by this reference.

BACKGROUND OF THE PRESENT DISCLOSURE

Field of the Present Disclosure

The present disclosure relates to a structure of a hybrid powertrain for a vehicle.

Description of Related Art

A hybrid vehicle is a vehicle which is driven by different types of power sources, such as a motor and an engine. Because a motor and an engine have different power characteristics from each other, the power generated by the motor and the power generated by the engine need to be appropriately combined to output power suitable for various driving conditions of a vehicle and to operate the engine at as optimal an operating point as possible to thus improve the fuel efficiency of the vehicle.

A hybrid vehicle implements an electric vehicle (EV) mode, in which the vehicle is driven only by a motor, a series mode, in which the vehicle is driven by the power from the motor, which is driven using electricity generated by the power from an engine, and a parallel mode, in which the vehicle is driven both by the power from the engine and by the power from the motor.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a hybrid powertrain apparatus for a vehicle, which is configured for implementing various drive modes, increasing the degree of freedom of operation of an engine when implementing a parallel mode, and consequently further improving the fuel efficiency of the vehicle.

In accordance with various aspects of the present disclosure, the above and other objects can be accomplished by the provision of a hybrid powertrain apparatus for a vehicle, including an engine, a first input shaft mounted to receive power from the engine, a first motor directly connected to the first input shaft, a second input shaft disposed concentrically with the first input shaft, a second motor directly connected to the second input shaft, a planetary gear set including three rotation elements, two of which are respectively connected to the first input shaft and the second input shaft and the remaining one of which is mounted to be selectively stationary, and an output gear integrally formed with the second input shaft to draw power.

The first input shaft may be connected to the engine via gears tooth-engaged with each other to receive power from the engine at a predetermined gear ratio.

The gears may be an internal gear and an internal pinion.

The engine may be provided with the internal gear, and the first input shaft may be provided with the internal pinion tooth-engaged with the internal gear.

The second input shaft may be formed as a hollow shaft surrounding the first input shaft, and the first input shaft and the second input shaft may be mounted to penetrate the inside of the second motor.

The planetary gear set may be provided with a clutch configured to engage two of the three rotation elements with each other.

The planetary gear set may include a sun gear connected to the first input shaft, a planet carrier connected to the second input shaft, and a ring gear mounted to be selectively secured to a transmission housing by a brake.

The clutch may be mounted to engage the sun gear and the ring gear of the planetary gear set with each other.

The power drawn by the output gear may be reduced and then transmitted to a differential.

The hybrid powertrain apparatus may further include a first intermediate gear tooth-engaged with the output gear and a second intermediate gear concentrically mounted with the first intermediate gear and tooth-engaged with a differential ring gear of the differential. The first intermediate gear may have a diameter larger than the second intermediate gear.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
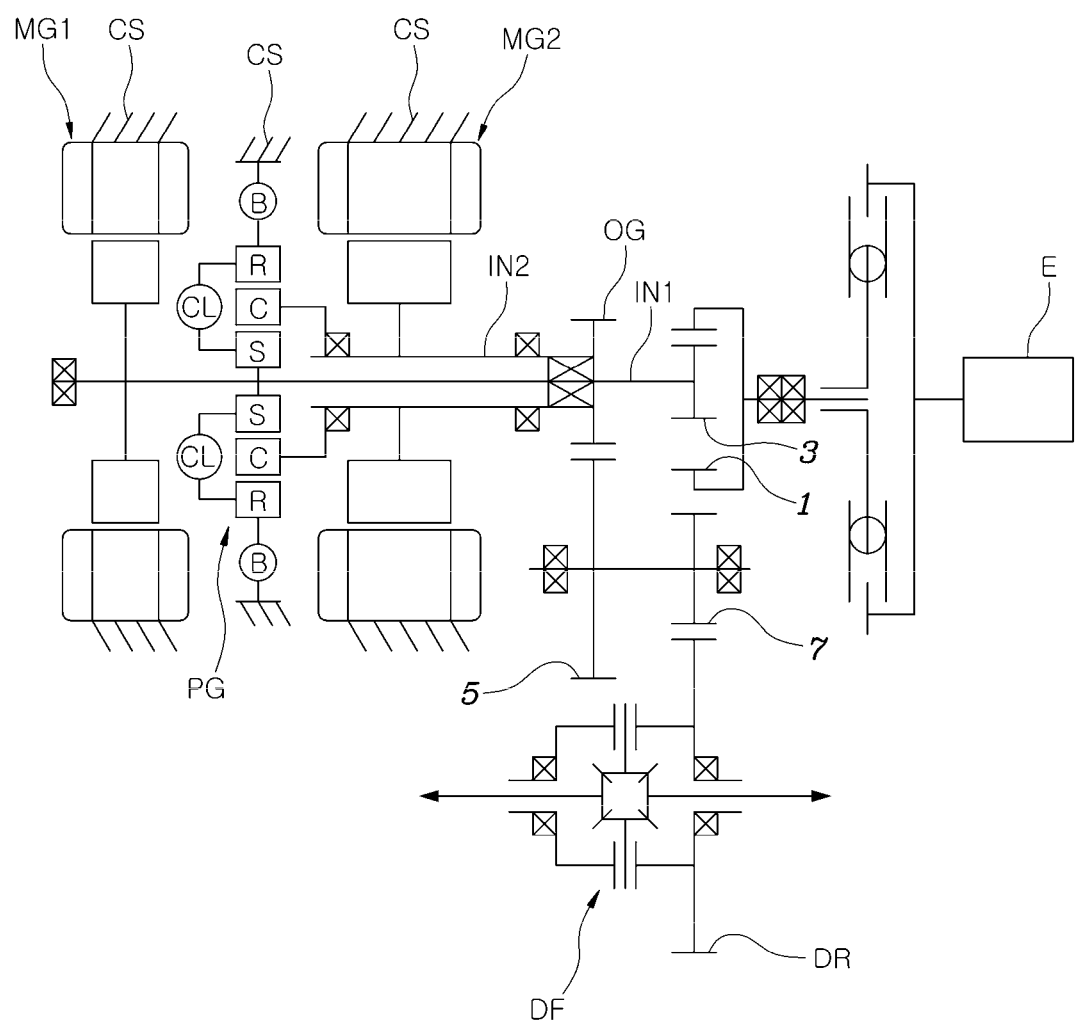
FIG. 1 is a diagram showing the structure of a hybrid powertrain apparatus for a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Various exemplary embodiments will now be described more fully with reference to the accompanying drawings, in which only some exemplary embodiments are shown. Specific structural and functional details included herein are merely representative for describing exemplary embodiments of the present disclosure. The present disclosure, however, may be embodied in many alternative forms, and may not be construed as being limited to the exemplary embodiments set forth herein.

Accordingly, while exemplary embodiments of the present disclosure are configured for being variously modified and taking alternative forms, embodiments thereof are shown by way of example in the drawings and will herein be described in detail. It may be understood, however, that there is no intent to limit the present disclosure to the exemplary embodiments disclosed. On the other hand, various exemplary embodiments are to cover all modifications, equivalents, and alternatives falling within the scope of the present disclosure.

It will be understood that, although the terms "first", "second", etc. may be used herein to describe various elements, these elements should not be limited by these terms. These terms are only used to distinguish one element from another. For example, a first element could be termed a second element, and similarly, a second element could be termed a first element, without departing from the scope of exemplary embodiments of the present disclosure.

It will be understood that when an element is referred to as being "connected" or "coupled" to another element, it may be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for describing various exemplary embodiments only and is not intended to be limiting of exemplary embodiments of the present disclosure. As used herein, the singular forms "a", "an", and "the", are intended to include the plural forms as well, unless the context clearly indicates otherwise. It will be further understood that the terms "comprises", "comprising", "includes", and/or "including", when used herein, specify the presence of stated features, integers, steps, operations, elements, components, or combinations thereof, but do not preclude the presence or addition of one or more other features, integers, steps, operations, elements, components, or combinations thereof.

Unless otherwise defined, all terms used herein, which include technical or scientific terms, have the same meanings as those generally appreciated by those skilled in the art. The terms, such as ones defined in common dictionaries, should be interpreted as having the same meanings as terms in the context of pertinent technology, and should not be interpreted as having ideal or excessively formal meanings unless clearly defined in the specification.

Hereinafter, various exemplary embodiments of the present disclosure will be described in detail with reference to the accompanying drawings. In the drawings, the same reference numerals refer to the same components.

Referring to FIG. 1, a hybrid powertrain apparatus for a vehicle according to various exemplary embodiments of the present disclosure includes an engine E, a first input shaft $IN_1$, which is mounted to receive power from the engine E, a first motor MG1, which is directly connected to the first input shaft IN1, a second input shaft IN2, which is disposed concentrically with the first input shaft IN1, a second motor MG2, which is directly connected to the second input shaft IN2, a planetary gear set PG, which includes three rotation elements, two of which are respectively connected to the first input shaft IN1 and the second input shaft IN2 and the remaining one of which is mounted to be selectively stationary, and an output gear OG, which is integrally formed with the second input shaft IN2 to draw power.

That is, according to the powertrain apparatus of the present disclosure, the power from the engine E and the first motor MG1 may be supplied to the first input shaft IN1, the power from the second motor MG2 may be supplied to the second input shaft IN2, the power supplied to the first input shaft IN1 may be transmitted after being reduced or may be transmitted as it is to the second input shaft IN2 through the planetary gear set PG, and the power may be transmitted to drive wheels through the output gear OG of the second input shaft IN2.

Therefore, when a parallel mode, in which the power from the engine E is supplied to the drive wheels together with the power from the second motor MG2, is implemented, the power from the engine E is transmitted after being reduced or is transmitted as it is to the second input shaft IN2 through the first input shaft IN1 and the planetary gear set PG. Accordingly, the engine E is freely operable in a wider range because it is configured for being operated at two different speeds relative to the rotation speed of the second motor MG2.

Since the engine E is operated with the above-described degree of freedom without being constrained by the rotation speed of the second motor MG2, the engine E may be controlled to operate at as optimal an operating point as possible, and consequently, the fuel efficiency of the vehicle may be improved.

The engine E is provided with an internal gear 1, and the first input shaft IN1 is provided with an internal pinion 3, which is tooth-engaged with the internal gear 1.

Accordingly, the engine E may be operated at a lower rotation speed than the first motor MG1, and the internal gear 1 and the internal pinion 3 may enable reduction in the volume of the powertrain apparatus of the present disclosure and realization of a more compact configuration thereof.

The second input shaft IN2 is formed as a hollow shaft that surrounds the first input shaft IN1, and the first input shaft IN1 and the second input shaft IN2 are mounted to penetrate the inside of the second motor MG2.

Furthermore, as shown in FIG. 1, the planetary gear set PG is disposed between the first motor MG1 and the second motor MG2. Thus, the first motor MG1, the planetary gear set PG, and the second motor MG2 form a compact configuration.

The planetary gear set PG is provided with a clutch CL, which engages two of the three rotation elements with each other.

The planetary gear set PG includes a sun gear S, which is connected to the first input shaft IN1, a planet carrier C, which is connected to the second input shaft IN2, and a ring gear R, which is mounted to be selectively secured to a transmission housing CS by a brake B.

The clutch CL is mounted to engage the sun gear S and the ring gear R of the planetary gear set PG with each other.

Figures 2, 3:
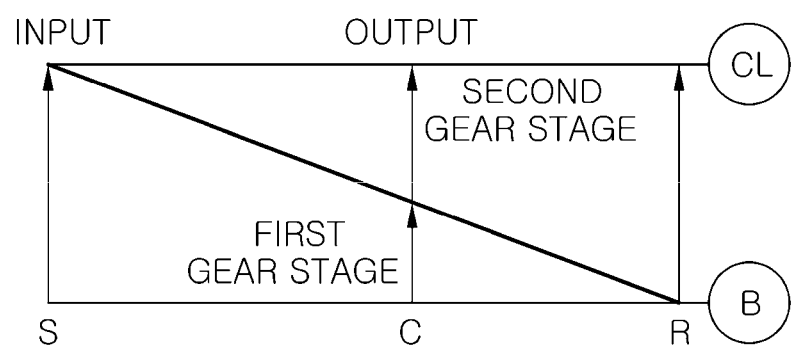
FIG. 2 is an operating mode table of the powertrain apparatus shown in FIG. 1.
FIG. 3 is a speed diagram of the powertrain apparatus shown in FIG. 1.

Accordingly, when the brake B is operated, the ring gear R is secured to the transmission housing CS, and thus the power input to the sun gear S from the first input shaft IN1 is reduced and then transmitted to the second input shaft IN2 through the planet carrier C. This operational state corresponds to the first gear stage shown in FIG. 2 and FIG. 3.

When the brake B is released and the clutch CL is engaged, the sun gear S and the ring gear R are connected to each other, and all of the rotation elements of the planetary gear set PG rotate integrally. Accordingly, the power input to the sun gear S from the first input shaft IN1 is transmitted as it is to the second input shaft IN2 through the planet carrier C. This operational state corresponds to the second gear stage shown in FIG. 2 and FIG. 3.

Meanwhile, the power drawn by the output gear OG, which is integrally formed with the second input shaft IN2, may be reduced and then transmitted to a differential DF.

To the present end, according to the exemplary embodiment of the present disclosure, a first intermediate gear 5 is tooth-engaged with the output gear OG, a second intermediate gear 7, which is concentrically mounted with the first intermediate gear 5, is tooth-engaged with a differential ring gear DR of the differential DF, and the first intermediate gear 5 has a diameter larger than the second intermediate gear 7.

Accordingly, the power drawn by the output gear OG is sequentially reduced through the first intermediate gear 5, the second intermediate gear 7, and the differential ring gear DR, and is then transmitted to the differential DF.

Because the drive wheels are connected to two opposite sides of the differential DF, the power transmitted to the differential DF is directly transmitted to the drive wheels.

In the hybrid powertrain apparatus for a vehicle of the present disclosure described above, an electric vehicle (EV) mode is implemented so that only the second motor MG2 is driven in the state in which both the brake B and the clutch CL are released.

Furthermore, a series mode is implemented such that, in the state in which both the brake B and the clutch CL are released, the engine E is driven to make the first motor MG1 generate electricity, and the second motor MG2 is driven by the electricity generated by the first motor MG1.

Furthermore, the first gear stage or the second gear stage described above, in which the brake B or the clutch CL is engaged, corresponds to implementation of a parallel mode, in which both the power from the engine E and the power from the second motor MG2 are supplied to the drive wheels.

As is apparent from the above description, the hybrid powertrain apparatus for a vehicle of the present disclosure is configured for implementing various drive modes, increasing the degree of freedom of operation of the engine when implementing a parallel mode, and thus facilitating the engine to be operated at a more optimal operating point. Consequently, the fuel efficiency of the vehicle may be further improved.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A hybrid powertrain apparatus for a vehicle, the hybrid powertrain apparatus comprising:
   an engine;
   a first input shaft mounted to receive power from the engine;
   a first motor directly connected to the first input shaft;
   a second input shaft disposed concentrically with the first input shaft;
   a second motor directly connected to the second input shaft;
   a planetary gear set including first, second and third rotation elements, wherein two of the first, second and third rotation elements are respectively connected to the first input shaft and the second input shaft and a remaining one of the first, second and third rotation elements is mounted to be selectively stationary; and
   an output gear integrally formed with the second input shaft to draw power,
   wherein the first, second and third rotation elements of the planetary gear set are a sun gear, a planet carrier and a ring gear, respectively,
   wherein the sun gear is connected to the first motor via the first input shaft,
   wherein the planet carrier is connected to the second motor via the second input shaft,
   wherein the ring gear is mounted to be selectively secured to a transmission housing by a brake, and
   wherein the planetary gear set is provided with a clutch configured to engage one of the two of the first, second and third rotation elements with the remaining one.

2. The hybrid powertrain apparatus of claim 1, wherein the first input shaft is connected to the engine via gears tooth-engaged with each other to receive power from the engine at a predetermined gear ratio.

3. The hybrid powertrain apparatus of claim 2,
   wherein the gears are an internal gear and an internal pinion, and
   wherein the engine is provided with the internal gear, and
   wherein the first input shaft is provided with the internal pinion tooth-engaged with the internal gear.

4. The hybrid powertrain apparatus of claim 1,
   wherein the second input shaft is formed as a hollow shaft surrounding the first input shaft, and
   wherein the first input shaft and the second input shaft are mounted to penetrate inside of the second motor.

5. The hybrid powertrain apparatus of claim 1, wherein the brake is mounted to selectively secure the remaining one to the transmission housing.

6. The hybrid powertrain apparatus of claim 1, wherein the two of the first, second and third rotation elements is the first rotation element directly connected to the first input shaft and the second rotation element directly connected to the second input shaft, and the remaining one is the third rotation element engaged to the first rotation element and the second rotation element.

7. The hybrid powertrain apparatus of claim 6, wherein the clutch is mounted to engage the sun gear and the ring gear of the planetary gear set with each other.

8. The hybrid powertrain apparatus of claim 1, wherein the power drawn by the output gear is reduced and then transmitted to a differential.

9. The hybrid powertrain apparatus of claim 8, further including:
- a first intermediate gear tooth-engaged with the output gear; and
- a second intermediate gear concentrically mounted with the first intermediate gear and tooth-engaged with a differential ring gear of the differential,
- wherein the first intermediate gear has a diameter larger than a diameter of the second intermediate gear.

* * * * *